United States Patent
King et al.

(10) Patent No.: US 9,484,120 B2
(45) Date of Patent: Nov. 1, 2016

(54) METHOD FOR ANNULUS SPACER DETECTION AND REPOSITIONING IN NUCLEAR REACTORS

(71) Applicant: ATOMIC ENERGY OF CANADA LIMITED, Mississauga (CA)

(72) Inventors: James M. King, Deep River (CA); Bruce A. W. Smith, Deep River (CA); Paul Feenstra, Deep River (CA)

(73) Assignee: Atomic Energy of Canada Limited, Mississauga (CA)

( * ) Notice: Subject to any disclaimer, the term of this patent is extended or adjusted under 35 U.S.C. 154(b) by 0 days.

(21) Appl. No.: 14/827,221

(22) Filed: Aug. 14, 2015

(65) Prior Publication Data
US 2016/0055925 A1    Feb. 25, 2016

Related U.S. Application Data (62) Division of application No. 12/677,465, filed as application No. PCT/CA2008/001601 on Sep. 10, 2008, now Pat. No. 9,109,722.

(60) Provisional application No. 60/971,423, filed on Sep. 11, 2007.

(51) Int. Cl.
*G21C 17/00*    (2006.01)
*F16L 7/00*    (2006.01)
(Continued)

(52) U.S. Cl.
CPC .................. *G21C 17/00* (2013.01); *F16L 7/00* (2013.01); *G21C 3/18* (2013.01); *G21C 17/06* (2013.01); *Y02E 30/40* (2013.01)

(58) Field of Classification Search
USPC ........................................................ 376/258
See application file for complete search history.

(56) References Cited

U.S. PATENT DOCUMENTS 4,613,477 A    9/1986    Dableh
4,867,940 A    9/1989    Cenanovic
(Continued)

FOREIGN PATENT DOCUMENTS

CA    2517421 A1    2/2006

OTHER PUBLICATIONS

Chaplin et al. (Nov. 19-21, 2000) "The AECL Fuel Channel Inspection System (AFCIS)," In; The 5th Intl CANDU Maintenance Conference, Toronto, CA.
Examiner's Requisition corresponding to Canadian Patent Application No. 2,698,252, dated Aug. 29, 2014.
International Preliminary Report on Patentability corresponding to International Patent Application No. PCT/CA2008/001601, completed Jan. 13, 2010.
(Continued)

*Primary Examiner* — Sean P Burke
(74) *Attorney, Agent, or Firm* — Lathrop & Gage LLP (57) ABSTRACT

The present invention provides an apparatus for detecting and/or repositioning annulus spacers used to maintain the position of a pressure tube within a calandria tube of a nuclear reactor. The method comprises the steps of: vibrationally isolating a section of the pressure tube; vibrating the wall of said pressure tube within said isolated section; detecting vibration of the wall at a minimum of two axial positions within said isolated sections; and detecting the reduction in vibration level of the wall at one or more of said axial positions in comparison to the remaining axial positions. The apparatus comprises a tool head to be inserted into the pressure tube, the tool head comprising a first end and a second and a clamping block m each of said ends. The clamping blocks are used to vibrationally isolate a section of the pressure tube located between said ends. The apparatus also comprises piezo-actuators operable to vibrate said pressure tube; and accelerometers used for measuring vibration of said pressure tube.

11 Claims, 10 Drawing Sheets

(51) Int. Cl.
*G21C 3/18* (2006.01)
*G21C 17/06* (2006.01)

(56) References Cited

U.S. PATENT DOCUMENTS

| | | | |
|---|---|---|---|
| 4,909,980 A | 3/1990 | Cenanovic | |
| 5,174,164 A | 12/1992 | Wilheim | |
| 6,450,104 B1 * | 9/2002 | Grant | B08B 9/049 |
| | | | 104/138.1 |
| 7,346,141 B2 | 3/2008 | Payne et al. | |
| 2007/0237283 A1 | 10/2007 | Payne et al. | |
| 2009/0158850 A1 * | 6/2009 | Alleyne | G01N 29/221 |
| | | | 73/623 |

OTHER PUBLICATIONS

International Search Report with Written Opinion corresponding to International Patent Application No. PCT/CA2008/001601, mailed Dec. 12, 2008.

Office Action corresponding to Chinese Patent Application No. 200880115564.2, issued May 18, 2012.

Office Action corresponding to Chinese Patent Application No. 200880115564.2, issued May 18, 2012—English translation.

Office Action corresponding to Korean Patent Application No. 1020107006135, issued Jan. 11, 2012—with English translation.

Office Action corresponding to Romanian Application No. a201000224/2010-001, dated Apr. 6, 2012—provided in English.

* cited by examiner

METHOD FOR ANNULUS SPACER DETECTION AND REPOSITIONING IN NUCLEAR REACTORS

CROSS-REFERENCE TO RELATED APPLICATIONS

This application is a divisional of U.S. patent application Ser. No. 12/677,465, filed May 11, 2010, which will issue on Aug. 18, 2015 as U.S. Pat. No. 9,109,722, which is the U.S. National Stage of International Application No. PCT/CA2008/001601, filed Sep. 10, 2008, which in turn claims the benefit of U.S. Provisional application No. 60/971,423, filed Sep. 11, 2007, each of which applications are incorporated by reference in their entirety herein.

FIELD OF THE INVENTION

This invention relates generally to a method of repositioning annular elements (spacers) that are constrained to move longitudinally in relation to a tube with which they are associated, the spacers being located on one side of the tube wall such that they are not directly accessible by mechanical repositioning means.

BACKGROUND

The present invention is especially applicable to the repositioning of spacers in a nuclear reactor, such as a CANDU® reactor. In a CANDU® nuclear reactor, the pressure tubes which contain the fuel bundles are each positioned within a calandria tube. It is necessary to have an annular space maintained between the pressure tube and the calandria tube to allow for the circulation of gases which thermally insulate the hot pressure tube from the relatively colder calandria tube and the heavy water moderator which flows in the space outside the calandria tube.

The annular space is maintained by annulus spacers, which are one component that make up a CANDU® reactor fuel channel. These spacers maintain the radial spacing between two coaxial tubes, an inner pressure tube and an outer calandria tube, and help the calandria tubes support the inner pressure tubes. There are both loose-fitting and snug-fitting annulus spacers, which differ in design.

A loose-fitting spacer comprises a closely coiled spring made from a square cross section wire, assembled on a circular girdle wire to form a torus. The girdle wire of the loose-fitting spacer is welded to form a continuous loop of fixed size. The minor diameter of the loose-fitting spacer is such that it is slightly larger than that of the outside diameter of a pressure tube. As such, the spacer fits loosely around the pressure tube. The spacer stays in its installed position by friction alone and not by spring tension. Loose-fitting spacers were used in earlier CANDU® reactors.

A snug-fitting spacer comprises a closely coiled spring made from a square cross section wire, assembled on a circular girdle wire to form a torus. The girdle wire is not welded, therefore the effective minor diameter of the spacer can be increased by applying tension to extend the coiled spring. The design of the snug-fitting spacer is such that the coil spring is under some tension when installed on a pressure tube, resulting in a snug fit. The design of the annulus spacer is such that they are not fixed rigidly in position. The spacer is held in position by spring tension and friction. Snug fitting spacers typically maintain their initial desired position, however, it may be possible that a spacer may move from its desired position, or, during the course of operation of a reactor, it may be desirable to move the position of a spacer.

Typically, four spacers are used in a fuel channel, each spacer being positioned at a different axial position. To provide the required support, the annulus spacers must be located at the proper position; if a spacer is out of position, the hot pressure tube may come into contact with the cooler calandria tube. Such contact between the inner pressure tube and the outer calandria tube is unacceptable.

During installation of spacers in such a reactor, or, as suggested above, during its operation, spacers may be displaced from their required positions with the result that the pressure tubes will lack the necessary configuration of supports to carry the distributed load in operation of the reactor, and serious problems may arise from sagging of these tubes. It is therefore desirable to have some way of detecting and repositioning (if necessary) the spacers after installation or even after the reactor has been operating for some time. The optimal position of a spacer may change slightly during the operating life of a reactor. The original installed spacer position is based on the support conditions throughout the reactor life. However, it may be desirable to reposition the spacers late in the reactor life to better suit the end of life conditions. Repositioning spacers late in life may extend the operating life of a reactor by some years, resulting in a significant economic benefit.

These annulus spacers are located between the pressure tubes and the calandria tubes and are not directly accessible by mechanical means. Since the spacer position is not fixed mechanically, it is desirable to have a means to detect their position.

U.S. Pat. No. 4,613,477 ("U.S. '477) discloses a method for repositioning garter springs, used as annulus spacers between the coolant tubes and calandria tubes of fluid cooled nuclear reactors. Such garter springs are not directly accessible by mechanical means. In the method of U.S. '477, an electromagnetic coil is advanced along the selected fuel channel to a position adjacent the garter spring, and a current pulse is passed through the coil thereby to exert an electromagnetic repulsive force on the garter spring having a component in the direction of the required displacement. This technique is applicable to the loose-fitting spacers which have the welded girdle wire. The welded girdle wire of the loose-fitting spacer forms a continuous electrical circuit that is necessary for the electromagnetic-based technique. The electromagnetic technique does not work on the tight-fitting spacer, because the non-welded girdle wire does not provide a continuous electrical path within the spacer.

A need remains for an apparatus and method for detecting and repositioning tight-fitting annulus spacers.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In accordance with one aspect of the present invention, there is provided a method of detecting an annulus spacer having an inner cylindrical surface in contact with an inner tube and an outer cylindrical surface in contact with a generally coaxial outer tube, which method comprises the steps of: vibrationally isolating a section of the inner tube; vibrating the wall of said inner tube within said isolated section; measuring vibration in the wall at a minimum of two axial positions within said isolated section, and detecting a reduction in the vibration level of the wall at one or more of said axial positions in comparison to the remaining axial position(s), wherein the reduction in vibration is indicative of the presence of the annulus spacer at or near the axial position at which said reduction in vibration was detected.

In accordance with another aspect of the present inventions, there is provided a method of axially repositioning an annulus spacer having an inner cylindrical surface in contact with an inner tube and an outer cylindrical surface in contact with a generally coaxial outer tube, which method comprises the steps of: vibrationally isolating a section of the wall of the inner tube adjacent to the annulus spacer; causing said annulus spacer to go from a loaded condition to an unloaded condition such that it is only in contact with said inner tube; vibrating the annulus spacer by vibrating the isolated section of the wall at a desired frequency such that the annulus spacer is displaced longitudinally from an initial position to a required position, whereby the vibration of the annulus spacer produces accelerations sufficient to overcome the tension of the annulus spacer on the inner tube.

In accordance with another aspect of the present invention there is provided an apparatus for detecting and/or repositioning an annulus spacer having an inner cylindrical surface in contact with an inner tube and an outer cylindrical surface in contact with a generally coaxial outer tube, comprising: a tool head having a first end and a second end; a first and a second clamping block assembly at said first and second ends, respectively, of said tool head; one or more piezo-actuators associated with said tool head and operable to vibrate said inner tube; and two or more accelerometers associated with said tool head for measuring vibration of said inner tube.

DETAILED DESCRIPTION OF THE INVENTION

Figure 1:
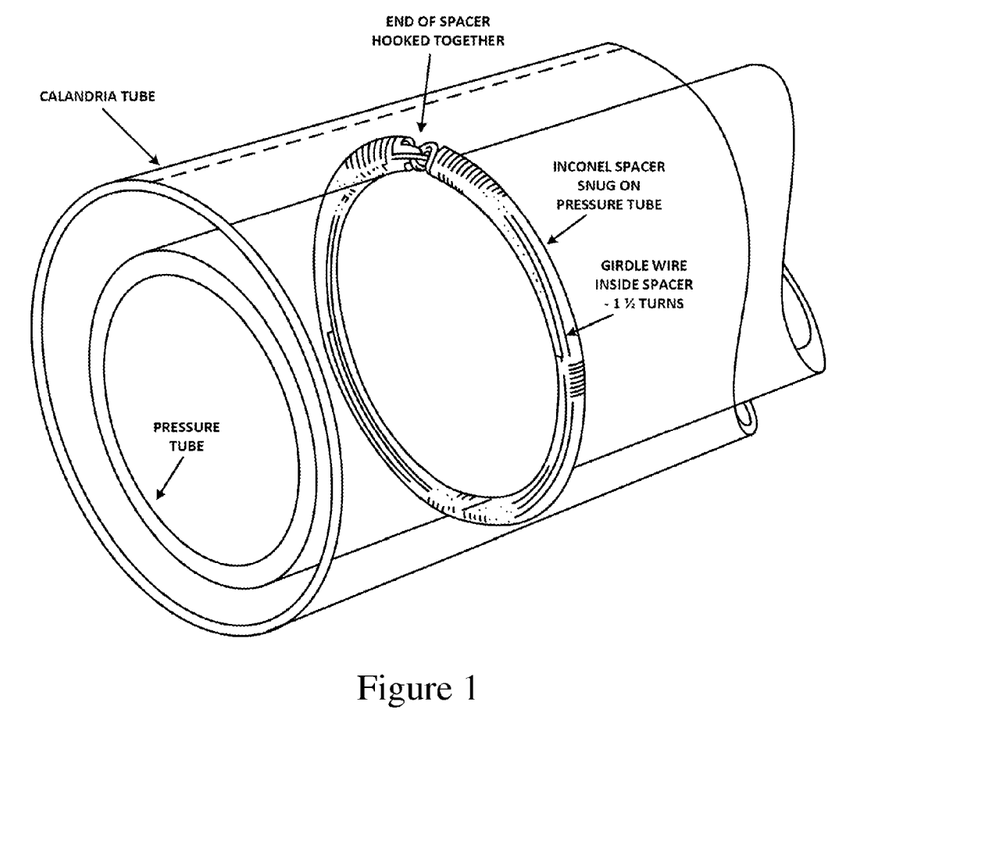
FIG. 1 depicts an arrangement of an inner pressure tube, an outer calandria tube and an annulus spacer.

The apparatus and methods of the present invention are useful for detection and/or repositioning of one or more annulus spacers surrounding a first tube that is positioned within, and generally coaxial with, a second tube (e.g., see FIG. 1). In the example depicted in FIG. 1, the annulus spacer maintains the radial spacing between the first tube (e.g., an inner tube) and the second tube (e.g., an outer tube). Typically more than one annulus spacer work together to maintain the radial spacing between the first tube and the second tube.

In a specific example of the present invention, the inner tube is a pressure tube, the outer tube is a calandria tube and the spacer is a snug-fitting annulus spacer, as would be found in a CANDU® nuclear reactor. In another specific example, the spacer is a loose-fitting annulus spacer. As will be readily appreciated by the skilled worker, the apparatus and methods of the present application can be used in other applications in which an inner tube is positioned within and coaxial with an outer tube and the tubes maintained in spaced relation by one or more annulus spacers.

As will be described in more detail below, there is provided an apparatus and method for detecting an annulus spacer, repositioning an annulus spacer or detecting and repositioning an annulus spacer. The methods are based on the use of an apparatus, such as a tool head, that is inserted inside a pressure tube.

Figure 2:
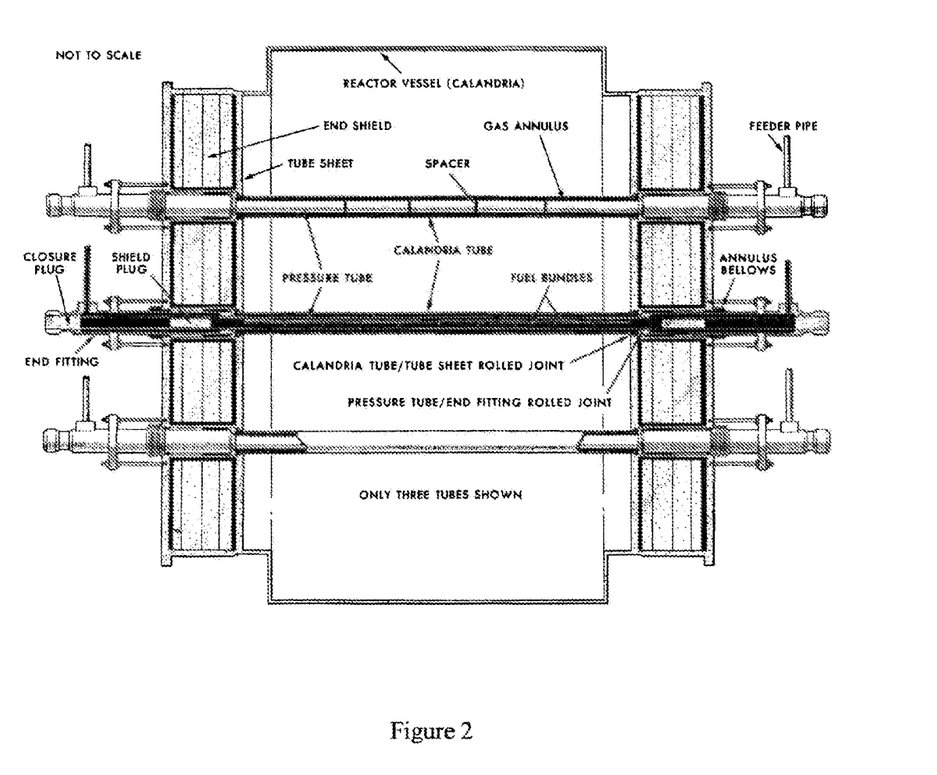
FIG. 2 is a schematic of a CANDU® reactor showing key components, including fuel channel annulus spacers, inner pressure tubes and outer calandria tubes.

In the case of a nuclear reactor, such as a CANDU® reactor, the apparatus (tool head) is inserted in a pressure tube when the reactor is shut down. FIG. 2 depicts an example of an arrangement of components within a CANDU® reactor. The apparatus (tool head) is delivered into the pressure tube using standard, existing delivery machines. The delivery machine is positioned at one end of the fuel channel and can form a sealed connection with the fuel channel end. The delivery machine is able to remove the closure plug from the end of the fuel channel to allow access to the pressure tube. The delivery machine can introduce tooling into a CANDU® fuel channel and position it at any length along the fuel channel. The delivery machine provides a mechanical interface for positioning the tool and provides for service connections to the tool, such as electrical power, control/feedback signals, pneumatic supply, or hydraulic supply. An example of a suitable delivery machine is the AECL Fuel Channel Inspection System.

Tool Head

Figure 3A:
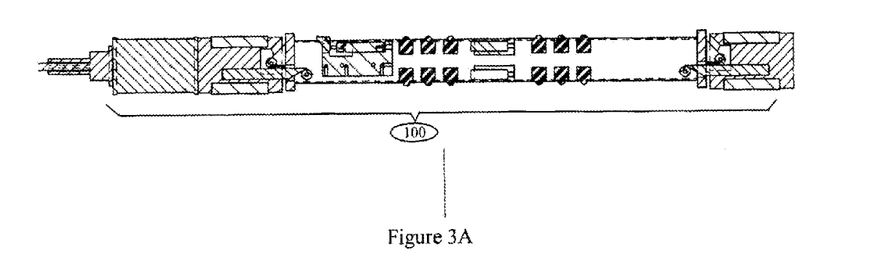
FIG. 3A depicts a tool head according to one embodiment of the present application and FIG. 3B depicts the tool head of FIG. 3A positioned within an inner pressure tube.
Figure 3B:
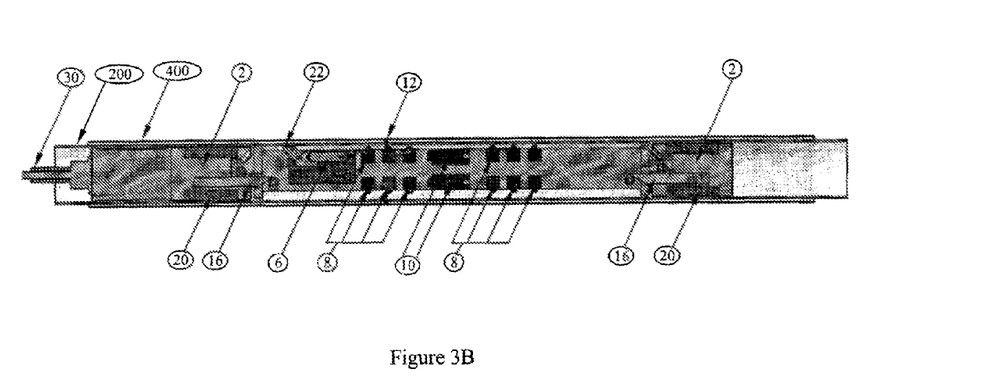

Referring now to FIGS. 3A and 3B, tool head 100 is sized for insertion within a first tube, such as pressure tube 200 in a nuclear reactor, and comprises actuators and sensors used for annulus spacer detection, repositioning, and detection/repositioning. Tool head 100 is configured for operative association with a delivery machine (not shown), and is suitable for use in a wet environment as would be present in pressure tube 200 and outer calandria tube 400, for example, in a CANDU® reactor.

Tool head 100 comprises clamping block assembly 2, coupling 16, piezo-actuator 6, accelerometer 8 and eddy current gap probe 10.

Clamping Block Assembly.

As shown in FIGS. 3A and 3B, tool head 100 includes clamping block assemblies 2 at a first end and at a second end of tool head 100. Each clamping block assembly 2 is removably attachable to coupling 16, and is adapted for rotation about coupling 16. Each clamping block assembly 2 includes clamping member(s) 20, which are moveable from a retracted position to an extended position. In the retracted position, clamping member(s) 20 do not impede movement of tool head 100 within pressure tube 200. In the extended position, clamping member(s) 20 engage the inner surface of pressure tube 200. Desirably, clamping member(s) 20 do not damage, or do not damage beyond acceptable tolerances, the inner surface of pressure tube 200. Each clamping block assembly 2 and clamping member(s) 20 are operable for use in pressure tube jacking (discussed further below) and are also used to vibrationally isolate a section of pressure tube 200 between each clamping block assembly 2 at the first and second end of pressure tube 200 (discussed further below).

Coupling 16 is actuated by hydraulic pressure supplied from the delivery machine. Actuation of the coupling 16 produces a moment between clamping block assembly 2 and the tool head 100. When clamping block assembly 2 is clamped to pressure tube 200 and coupling 16 is actuated, the moment is applied to pressure tube 200. This moment applied to pressure tube 200 effectively lifts pressure tube 200 away from calandria tube 400. This operation may be used to remove any load on an annulus spacer 12 and cause annulus spacer 12 to come out of contact with calandria tube 400. Removal of the load from an annulus spacer 12 is required in order to allow the annulus spacer 12 to be freely moved.

Piezo-Actuator.

Tool head 100 includes piezo-actuator 6, which is operable to apply vibrations to the inside surface of pressure tube 200. Typically only one piezo-actuator 6 is included in a tool head. However, more than one piezo-actuator 6 can be incorporated in tool head 100 if desired and/or if necessary.

Piezo-actuator 6 includes bearing pad 22 that is movable from a retracted position to an extended position. In the retracted position, bearing pad 22 does not impede movement of tool head 100 within pressure tube 200. In the extended position, bearing pad 22 is brought into contact with the inner wall of pressure tube 200.

The position of piezo-actuator 6 with respect to the clamping block assembly 2 affects the ability of the piezo-actuator 6 to provide power to vibrate the pressure tube in the desired mode. Piezo-actuator 6 has limitations with respect to its travel (or stroke) and the force that it can apply. The amount of force and stroke required to vibrate pressure tube 200 is dependent on the location of piezo-actuator 6 with respect to the mode shape, and therefore, also with respect to the clamping block assemblies 2, which define the length of the segment of the vibrating pressure tube, and thereby affect the modes of vibration. There is a location or a location range that allows piezo-actuator 6 to better produce the desired mode shape or shapes. In general, a balance has to be achieved between force and stroke. Typically, a location that requires less stroke also requires more force, and vice versa. The performance characteristics of piezo-actuator 6 is matched to the force and stroke requirements of the particular mode shape or shapes.

When bearing pad 22 is in contact with the inner wall of pressure tube 200, piezo-actuator 6 is operable to vibrate a portion of pressure tube 200 in a controlled manner. Piezo-actuator 6 is controlled using an amplifier (not shown) and signal generator (not shown), such that it can be made to operate at a desired frequency. The frequency of vibration of piezo-actuator 6 selected will depend on a variety of non-limiting factors such as operating conditions, materials used, user preference, regulatory requirements and/or the like. In one embodiment, piezo-actuator 6 generates vibrations at a natural frequency of pressure tube 200. In one embodiment, piezo-actuator 6 generates vibrations in the frequency range of about 100 Hz to about 1500 Hz. In one embodiment, piezo-actuator 6 generates vibrations at approximately 400 Hz, which corresponds to the (1,1) mode. In one embodiment, piezo-actuator 6 generates vibrations at approximately 625 Hz, which corresponds to the (2,1) mode. In one embodiment of the invention, piezo-actuator 6 generates vibrations at approximately 1096 Hz, which corresponds to the (3,1) mode.

As noted above, each clamping block assembly 2 and assembly clamping members 20 are operable to vibrationally isolate the section of pressure tube 200 between each clamping block assembly 2, at the first and second ends of pressure tube 200. Prior to actuation of piezo-actuator 6, assembly clamping members 20 may be moved to the extended position, contacting the inner surface of pressure tube 200. When assembly members 20 are in the extended position, the portion of pressure tube 200 between each clamping block assembly 2 is vibrationally isolated from the remainder of pressure tube 200. As used herein, vibrationally isolated is understood to mean that vibrations produced by piezo-actuator 6 within the portion of pressure tube 200 bounded by clamping members 20, are kept apart or away from the remainder of pressure tube 200 so as to minimize or eliminate the effect of vibrations on the remainder of pressure tube 200.

Accelerometers.

Tool head 100 includes accelerometers 8, which detect vibrations of pressure tube 200. Accelerometer(s) 8 may also be used to detect impacts between annulus spacer 12 and the outer surface of pressure tube 200 during movement of annulus spacer 12 (discussed further below).

The number and positioning of accelerometer(s) 8 in tool head 100 vary with the intended use. The accelerometers are typically used in pairs, with a pair consisting of two accelerometers 8 located at generally the same axial position in the tool, with one accelerometer 8 positioned to measure acceleration at the vertical top of the pressure tube 200 and one accelerometer 8 positioned to measure acceleration at the vertical bottom of the pressure tube 200.

There are typically at least six accelerometers 8 (i.e. three accelerometer pairs), however, additional accelerometer 8 pairs may be used. Desirably, tool head 100 includes twelve accelerometers 8 mounted as six pairs. In the embodiment of FIG. 3A, tool head 100 includes twelve accelerometers 8. The embodiment of FIGS. 3A and 3B provide three accelerometer 8 pairs on either side of the axial centerline of the tool, allowing the tool head to measure the position of annulus spacer 12 on either side of the tool head centre, which corresponds to the antinode locations for j=2 modes. In other embodiments, there are only six accelerometers 8 (three pairs) located on one side of the tool axial centre. In a specific embodiment of the invention, the tool incorporates means for moving the accelerometers axially within the tool to improve the detection resolution. This may be accomplished by mounting accelerometers 8 in a moveably attached component within tool head 100 which may be moved axially within tool head 100 by any standard mechanical means such as an electric motor and leadscrew or a hydraulic cylinder.

Eddy Current Gap Measurement Probe.

Tool head 100 also includes eddy current gap measurement probe 10 to obtain measurements to confirm that annulus spacer 12 is in the unloaded position following pressure tube jacking. Such use of eddy current gap measurement probe 10 is known to the skilled worker. In the embodiment of FIGS. 3A and 3B, tool head 100 includes two eddy current gap probes 10 to enable the gap above and below the pressure tube 200 to be measured simultaneously. In other embodiments, there is only one eddy current gap probe 10 to measure the gap below the pressure tube. In a specific embodiment of the invention, tool head 100 includes three eddy current gap probes 10 to measure the gap above, below, and to one side of the pressure tube.

Umbilical

Tool head 100 is configured for operative association with umbilical 30. Umbilical 30 includes appropriate electrical cables and hydraulic and/or pneumatic hoses to connect tool head 100 to an out-of-reactor power unit and control system (not shown). Out-of-reactor power unit includes a hydraulic power supply (pump, valves) and electrical power supplies. This unit is a source of power and amplification, and may be positioned adjacent to the reactor, proximal to the services for the delivery machine.

Control Station.

Tool head 100 is operable from a control station (not shown), which is desirably located in a low radiation environment, away from the reactor. The control station includes such items as signal conditioning for transducers, means for data acquisition and an operator interface. Special purpose software is included to control tool head 100 and analyse the data resulting from annulus spacer 12 detection, movement and/or detection and movement processes. Dedicated procedures, outlined for example in user manuals, are included to guide/instruct operators in annulus spacer 12 detection and/or annulus spacer 12 repositioning. It will be clear that tool head 100 can be included as a kit, to retrofit existing machines.

Methods

During operation of a reactor, it may be possible for annulus spacer(s) 12 to move axially along pressure tube 200. This movement of annulus spacer(s) 12 can result from vibration and/or thermal cycling of the reactor. When axial movement of annulus spacer(s) 12 occurs, it may be necessary or desirable to reposition annulus spacer(s) 12. Alternatively or additionally, it is possible that initial placement of annulus spacer(s) 12 is not optimal or desired, and here again it may be necessary or desirable to reposition annulus spacer(s) 12, from a first position to a second position.

Tool head 100 may be used for (i) detecting annulus spacer(s) 12, (ii) repositioning annulus spacer 12, and/or (iii) detecting annulus spacer 12 during repositioning. Vibration-based techniques are used for both detection and repositioning of annulus spacer 12. The following discussion provides details of methods of using the apparatus of the present invention to detect and/or reposition an annulus spacer; however, it will be clear that variations can be made to the following methods while not deviating from the present invention. Such methods are within the scope of the present application.

Annulus Spacer Detection

Detection of annulus spacer 12 is achieved by monitoring changes in the response of the pressure tube 200 vibrations caused by the presence of annulus spacer 12.

Tool head 100 is inserted in pressure tube 200 to an initial position. The initial position may be close to a position where a user expects annulus spacer 12 to be. Alternatively, if for example the user does not have knowledge of where annulus spacer 12 is anticipated to be, the initial position of tool head 100 can be an arbitrary position within pressure tube 200.

After the tool head is positioned at the selected location, clamping members 20 are actuated to move into contact with and apply pressure to the wall of the inner tube in such a manner that a section of the inner tube is vibrationally isolated from the remainder of the tube. The vibrational isolation is used to establish a consistent environment for detection of changes without effecting the remainder of the tube. The isolated section is subsequently vibrated through the action of the piezo-actuator and acceleration measurements are taken at three or more axial locations to determine the frequency response. The measurements from the different axial locations are compared and a relative change in the frequency response indicates the presence of a loaded spacer.

Figure 5:
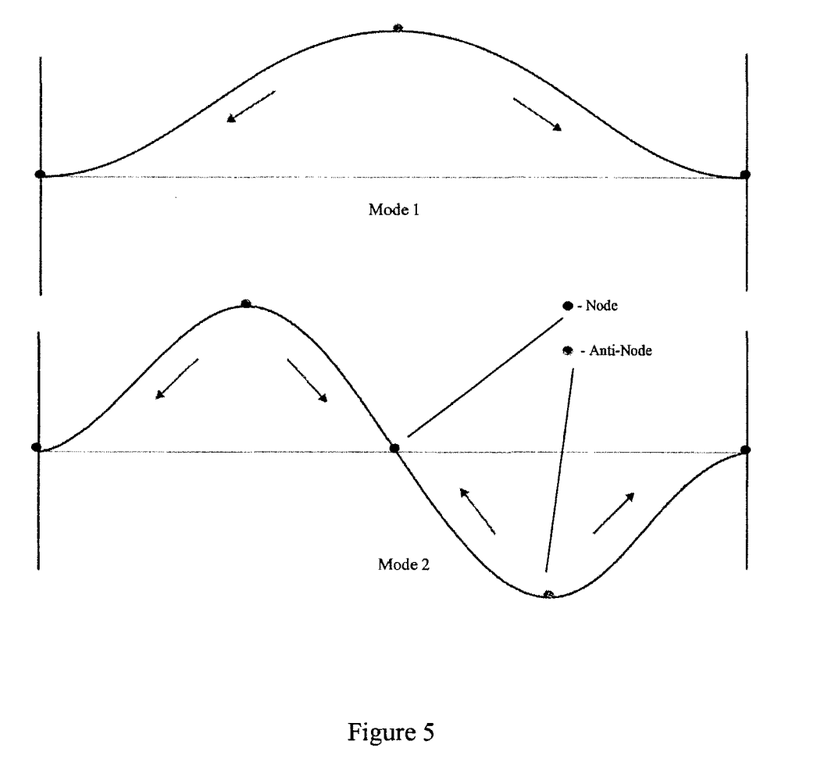
FIG. 5 depicts axial variation of modes for a clamped-clamped beam. The arrows indicate the direction of spacer movement (away from an anti-node and towards a node).

FIG. 5 depicts plots of the first and second axial mode shapes for a clamped-clamped beam. As used herein, "clamped-clamped beam" can be established with tool head 100 positioned in the desired location of pressure tube 200, each clamping block assembly 2 is actuated to move assembly clamping member 20 from the retracted position to the extended position, thereby vibrationally isolating a portion of pressure tube 200.

Figure 6:
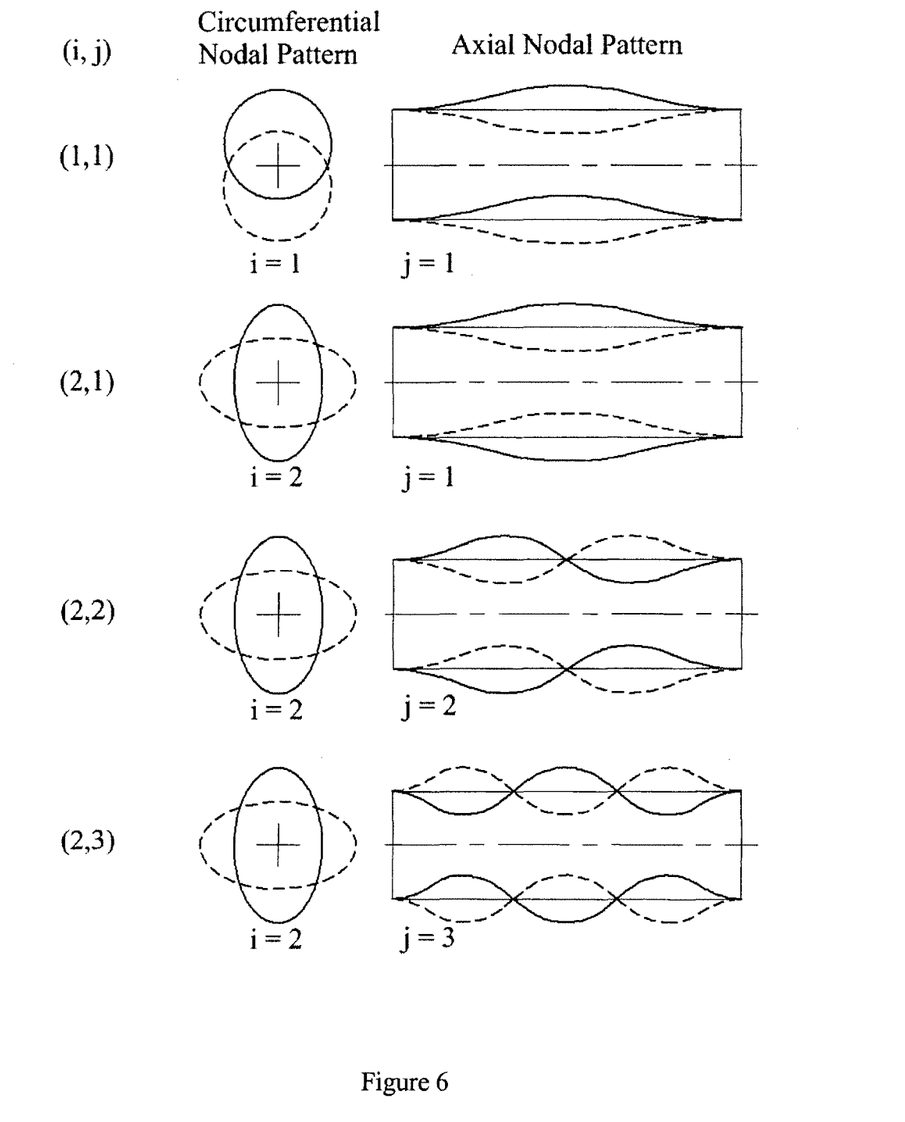
FIG. 6 is a plot of circumferential and axial nodal patterns for a clamped-clamped beam with a circular cross-section.

FIG. 6 depicts the circumferential and axial mode shapes for a clamped-clamped beam with a circular cross-section.

Detection of the position of annulus spacer 12 is based on the differences in the vibration responses at the top and bottom of pressure tube 200 vibrating in the vicinity of a loaded annulus spacer 12. Annulus spacer 12 primarily contacts calandria tube 400 near the bottom of the tube, and transmits force to the pressure tube 200 primarily at this location. Detection is achieved by exciting a random vibration in pressure tube 200 using piezo-actuator 6 and measuring the response of pressure tube 200 at both a top position and a bottom position of pressure tube 200 using accelerometers 8 at three or more axial locations. The acceleration is monitored at the natural frequencies of the pressure tube section, where the expected maximum accelerations are highest. The presence of annulus spacer 12 alters the local acceleration and deflection of the pressure tube wall, primarily at the bottom of pressure tube 200. This produces an asymmetry in the circumferential mode shape. In use, tool head 100 is positioned inside pressure tube 200 and random vibrations are excited using tool piezo-actuator 6.

A comparison between the pressure tube acceleration at the top position and the bottom position is performed at multiple axial positions to identify spacer location(s). This is illustrated in the views provided in FIG. 4. View A depicts a simplified axial cross section view of a beam mode in a pressure tube. Acceleration measurements are taken at the top position and the bottom position, designated $a_t$ and $a_b$, respectively, in FIG. 4. View B shows a simplified view of the 'modified' beam mode as it is affected by the reactionary force from a loaded annulus spacer 12. The presence of annulus spacer 12 is determined by comparing measurement $a_t$ and $a_b$ at various axial locations along pressure tube 200.

Figure 4:
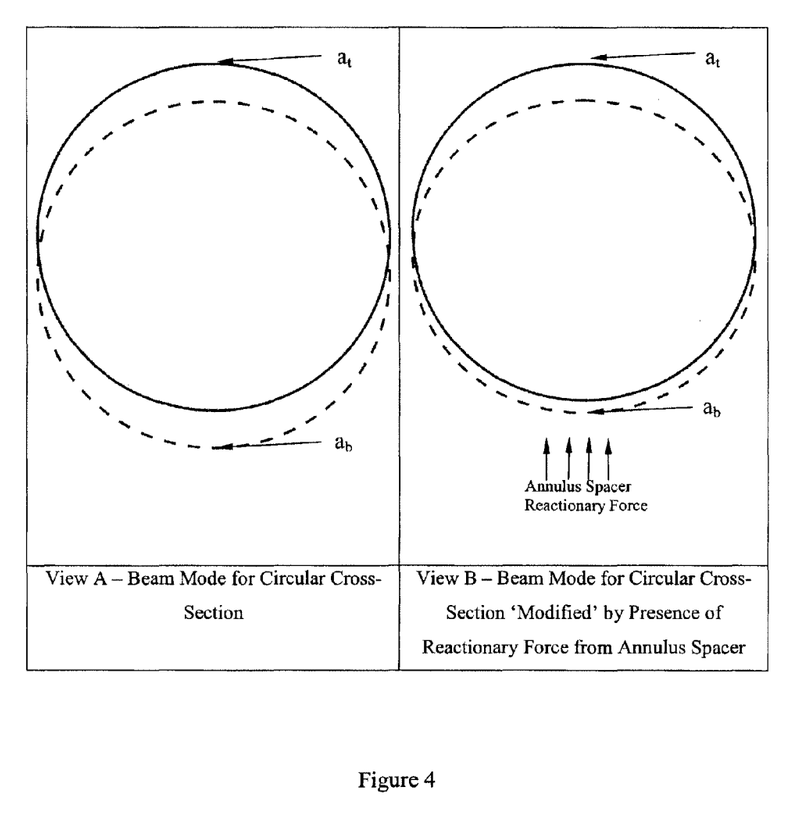
FIG. 4 depicts simplified views showing the difference in mode shapes for a pressure tube, with and without the presence of a loaded annulus spacer—View A—beam mode for circular cross-section—View B—beam mode for circular cross-section 'modified' by presence of reactionary force from annulus spacer.

In the absence of annulus spacer 12, the absolute value of $a_t$ and $a_b$ are approximately equal. However, when a loaded annulus spacer 12 is present, there is a difference between $a_t$ and $a_b$. The value of $a_b$ is reduced typically in the range of 20-40% compared to the value of $a_t$. At any given frequency, the ratio of the absolute value of the acceleration measured at the top and bottom of the pressure tube is defined as the frequency response function at that frequency.

Figure 7:
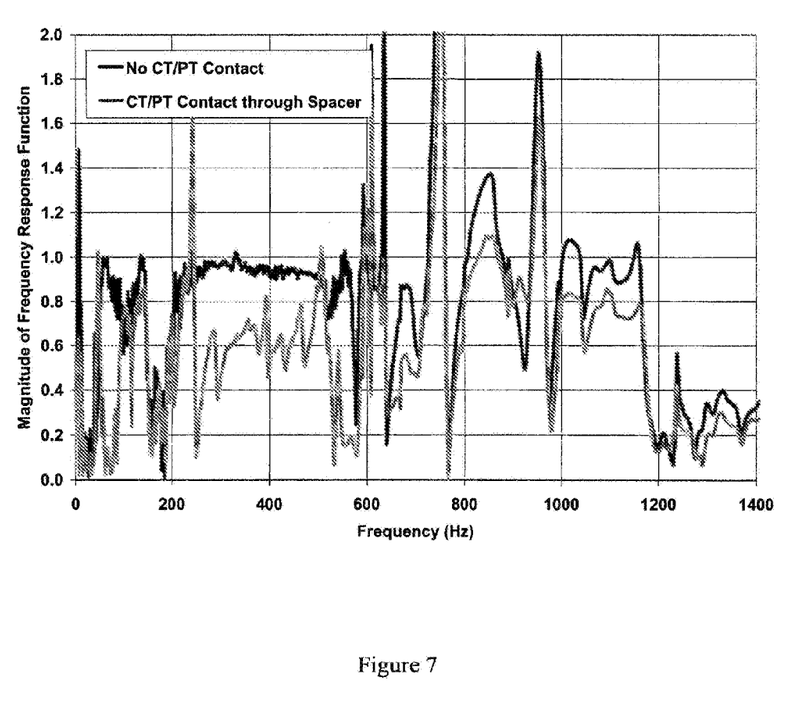
FIG. 7 shows a plot of the frequency response function for a 800 mm section of pressure tube versus frequency, illustrating the differences in response when there is no calandria tube/pressure tube contact (no loaded annulus spacer) and when there is calandria tube/pressure tube contact through a spacer (loaded annulus spacer).

FIG. 7 depicts a plot of the frequency response function spectra for a section of pressure tube, with and without the presence of a loaded annulus spacer. The plot of FIG. 7 shows that there are significant differences in the frequency response function with and without a loaded spacer in certain frequency ranges. This relationship allows spacer detection to be achieved by analyzing the accelerations within an identified frequency range or ranges.

Figure 8:
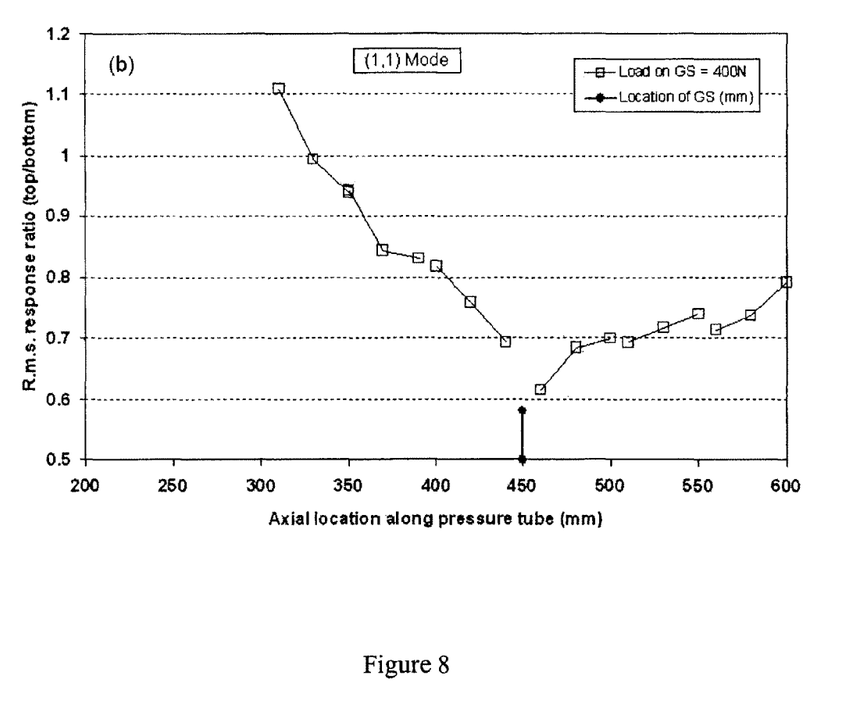
FIG. 8 shows a plot of frequency response ratio versus axial position of a spacer for a frequency range around the (1,1) mode. The annulus spacer is positioned at 450 mm along the pressure tube. The plot clearly shows that the frequency response ratio exhibits a local minima corresponding to the loaded spacer position.

FIG. 8 is a plot depicting the frequency response ratio as a function of axial position along the pressure tube for frequencies in the range of the (1,1) mode. The loaded annulus spacer is located at the 450 mm axial position of a 800 mm long pressure tube section. The testing was done with an annulus spacer load of 400 N. The plotted frequency response function exhibits a minima of approximately 0.6 at the axial location corresponding to the annulus spacer.

Figure 9:
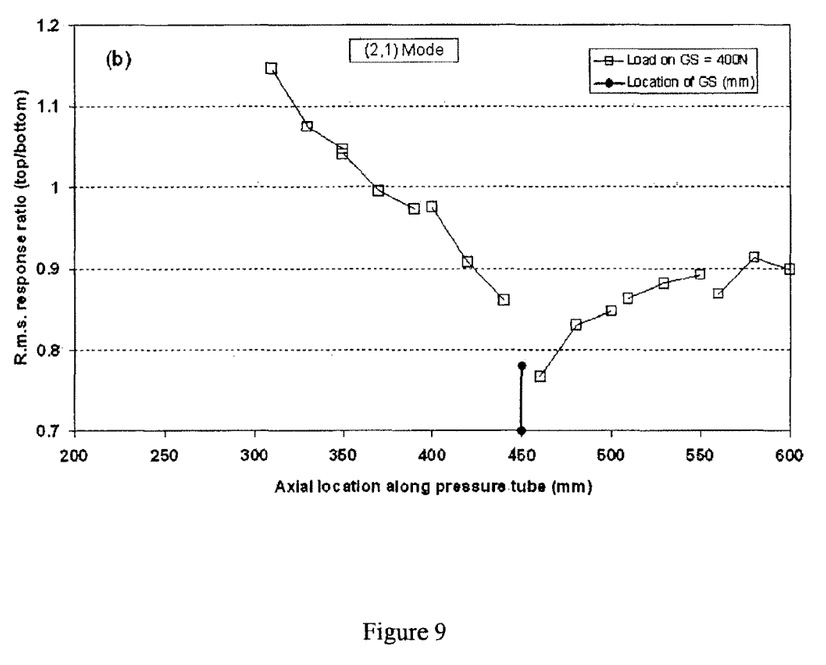
FIG. 9 shows a plot of frequency response ratio versus axial position of a spacer for a frequency range around the (2,1) mode. The annulus spacer is positioned at 450 mm along the pressure tube. The plot clearly shows that the frequency response ratio exhibits a local minima corresponding to the loaded spacer position.

FIG. 9 depicts a plot of the frequency response ratio as a function of axial position along the pressure tube for frequencies in the range of the (2,1) mode. The loaded annulus spacer is located at the 450 mm axial position. The plotted frequency response function exhibits a minima of approximately 0.76 at the axial location corresponding to the annulus spacer.

Pressure Tube Jacking

After some period of operation of a reactor, annulus spacer 12 is in contact with pressure tube 200 and outer calandria tube 400 (a loaded condition). For repositioning of annulus spacer 12, it is necessary to bring annulus spacer 12 out of contact with calandria tube 400 (an unloaded condition), to free annulus spacer 12 for movement. Moving annulus spacer 12 from a loaded condition to an unloaded condition is carried out by applying a moment of force to pressure tube 200 using tool head 100. This procedure is also known to the skilled worker as pressure tube jacking or jacking. Eddy current gap probe(s) 10 is/are used to measure the pressure tube-to-calandria tube gap, to confirm that annulus spacer 12 is in the unloaded condition. Thus, eddy current gap probe(s) 10 may also be used to determine if it is necessary to apply a moment of force to pressure tube 200.

Tool head 100 is configured to apply a moment of force to pressure tube 200, using clamping block assembly 2. As noted above, clamping block assembly 2 is operable for rotation about coupling 16. To apply a moment of force, tool head 100 is positioned within pressure tube 200 and assembly members 20 are moved to the extended position. Each clamping block assembly 2 is rotated (in opposite direction to one another) and a moment of force is applied in the vertical plane parallel to the pressure tube axis. The applied moment of force effectively lifts inner pressure tube 200 off outer calandria tube 400, thereby taking annulus spacer 12 out of contact with calandria tube 400 and freeing annulus spacer 12 for movement. Thus, by applying the moment of force to pressure tube 200, annulus spacer 12 is moved from the loaded condition to the unloaded condition. Such pressure tube jacking is also used in the case of a type of annulus spacer known as a loose-fit spacer.

Annulus Spacer Repositioning

Repositioning of annulus spacer 12 is achieved by vibrating a section of the pressure tube in a controlled manner. To reposition annulus spacer 12, tool head 100 is positioned within pressure tube 200 at a desired location with respect to annulus spacer 12. Desirably, the position of annulus spacer 12 is determined as discussed above. Once tool head 100 is positioned in the desired location, each clamping block assembly 2 is actuated to move assembly clamping member 20 from the retracted position to the extended position, thereby vibrationally isolating a portion of pressure tube 200. This vibrational isolation provides a standard fixed length of pressure tube 200 located between the two clamping block assemblies 20 for the vibration-based repositioning of annulus spacer 12. Tool head 100 is used to apply a moment of force to pressure tube 200, to raise the pressure tube and remove the load from the annulus spacer 12. In some instances, if the annulus spacer were normally in the unloaded condition, it is possible to move a snug-fitting annulus spacer 12 without jacking the pressure tube. The unloading of annulus spacer 12 is confirmed by measuring the pressure tube-to-calandria tube gap using eddy current gap probe 10. Eddy current gap probe 10 provides information used to determine the amount of moment necessary to apply to pressure tube 200.

Once in position, and annulus spacer 12 is in the unloaded position, bearing pad 22 within piezo-actuator 6 is moved from the retracted position to the extended position. Piezo-actuator 6 is operable to vibrate the pressure tube 200 at the desired frequency. The frequency of vibration is selected to match a natural frequency of the isolated pressure tube section. Typically the (2,1) mode is used for spacer repositioning as this mode provides for the highest efficiency in terms of power provided by the piezo-actuator versus peak pressure tube acceleration produced. However, other higher modes such as (2,2) and (2,3) may be used. For a water-filled pressure tube with an active vibrating length of 800 mm, frequencies of 626 Hz, 793 Hz and 1096 Hz correspond to the (2,1), (2,2) and (2,3) modes, respectively. The frequency of vibration of piezo-actuator 6 selected will depend on a variety of non-limiting factors such as operating conditions, actual pressure tube size, damping effects of the tool head, user preference, regulatory requirements and/or the like. The frequency of vibration produced may be adjusted to match the actual natural frequency by monitoring the pressure tube acceleration produced during actuation. The vibrations cause annulus spacer 12 to vibrate as well. These vibrations in annulus spacer 12 produce accelerations that are high enough to overcome the spring tension in the spacer and allow the spacer to lift off of the surface of the pressure tube. Desirably, tool head 100 is positioned to initially place annulus spacer 12 between a node and an anti-node of the mode shape generated by the vibrations. The vibrations typically cause annulus spacer 12 to move away from an anti-node and towards a node (FIG. 4). This is shown graphically in FIG. 4, which shows two axial mode shapes of a clamped-clamped beam. The relative position of annulus spacer 12 with respect to the mode shape determines the direction of spacer movement. A variety of mode shapes may be used. The greater the mode number desired for use, the greater the amount of power that is required to produce an equivalent acceleration.

Annulus Spacer Monitoring During Repositioning

In one example, the movement of annulus spacer 12 is monitored during movement of annulus spacer 12. This is carried out using accelerometers 8 to detect the high frequency impacts between annulus spacer 12 and pressure tube 200 as annulus spacer 12 vibrates during movement. Multiple accelerometers at different positions on tool head 100 are used. The difference in the time when the impact is detected by the accelerometers and the magnitude of the impact is used to determine spacer location and movement.

Figure 10:
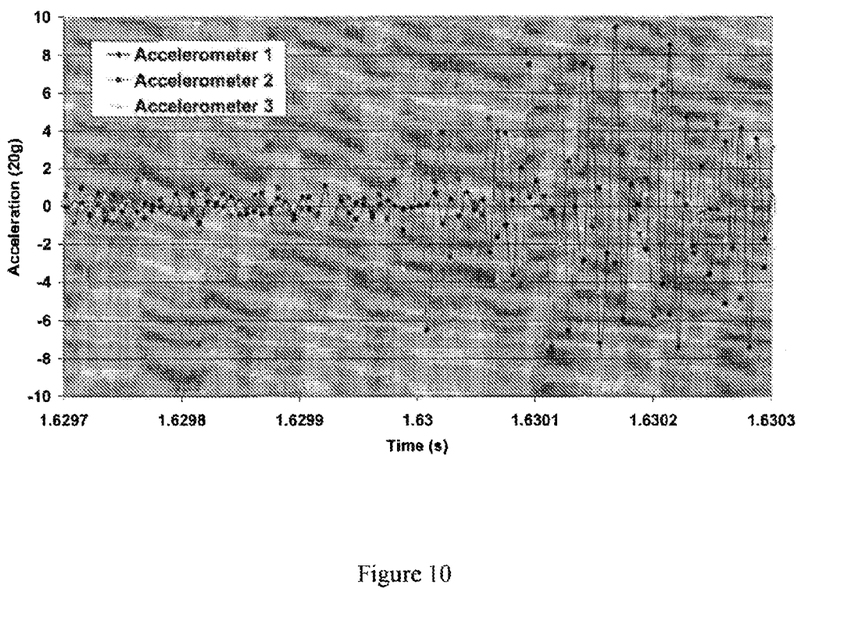
FIG. 10 shows a plot of accelerometer response to a single impact between an annulus spacer and a pressure tube versus time. Accelerometer 3 was positioned closest to the spacer and Accelerometer 1 was positioned furthest from the spacer.

FIG. 10 is a graph depicting acceleration as a function of time, detected at accelerometers 8 positioned at various positions on tool head 100. (Each of the three accelerometers 8 is designated 1, 2, and 3). The data were taken from a single annulus spacer 12 impact with the pressure tube 200. In this example, accelerometer 3 was located 27 mm axially from the annulus spacer 12 and near the pressure tube top. Accelerometer 2 was located 76 mm axially from annulus spacer 12 and also near the pressure tube top. Accelerometer 1 was located 87 mm axially from annulus spacer 12 and was located near the pressure tube bottom. It will be noted from the graph that the start of the acceleration response occurred later in time the further away from the impact accelerometer 8 was located. The wave front moves at approximately 1700 m/s. The initial acceleration peak is reduced the further away the accelerometer is from the annulus spacer impact. The time delay and the reduction in amplitude may be used to determine the position of annulus 12 spacer impact.

Kits

It will be clear that tool head 100, and/or components of tool head 100, can be included as a kit. Such a kit may optionally include instructions for use and/or software for operating tool head 100.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of axially repositioning an annulus spacer having an inner cylindrical surface in contact with an inner tube and an outer cylindrical surface in contact with a generally coaxial outer tube, which method comprises the steps of:
   (a) vibrationally isolating a section of the wall of the inner tube adjacent to the annulus spacer;
   (b) causing said annulus spacer to go from a loaded condition to an unloaded condition;
   (c) vibrating the annulus spacer by vibrating the isolated section of the wall at a desired frequency such that the annulus spacer is displaced longitudinally from an initial position to a required position, whereby the vibration of the annulus spacer produces accelerations sufficient to overcome the tension of the annulus spacer on the inner tube.

2. The method of claim 1, wherein said step of vibrationally isolating the section of the inner tube comprises applying pressure to the inner surface of the wall of the inner tube at a first and a second position, which first and second position define the boundaries of said vibrationally isolated section.

3. The method of claim 1, wherein in step (c) the vibration of the annulus spacer is continued for a predetermined length of time.

4. The method of claim 1, wherein prior to step (a), the position of the annulus spacer is determined by:
   (i) vibrationally isolating a section of the inner tube;
   (ii) vibrating the wall of said inner tube within said isolated section;
   (iii) detecting vibration of the wall at a minimum of two axial positions within said isolated section; and
   (iv) detecting a reduction in vibration level of the wall at one or more of said axial positions in comparison to the remaining axial position(s),
   wherein the reduction in vibration level is indicative of the presence of the annulus spacer at or near the axial position at which said reduction in vibration was detected.

5. The method of claim 4, wherein said step of vibrationally isolating the section of the inner tube comprises applying pressure to the inner surface of the wall of the inner tube at a first and a second position, which first and second position define the boundaries of said vibrationally isolated section.

6. The method of claim 4, wherein following step (c) the new position of the annulus spacer is determined by:
   (v) vibrationally isolating a section of the inner tube;
   (vi) vibrating the wall of said inner tube within said isolated section;
   (vii) detecting vibration of the wall at a minimum of two axial positions within said isolated section; and
   (viii) detecting a reduction in vibration level of the wall at one or more of said axial positions in comparison to the remaining axial position(s),
   wherein the reduction in vibration level is indicative of the presence of the annulus spacer at or near the axial position at which said reduction in vibration was detected and wherein steps (a)-(c) are repeated as necessary to move the annulus spacer to a prescribed location about said inner tube.

7. The method of claim 6, wherein said step of vibrationally isolating the section of the inner tube comprises applying pressure to the inner surface of the wall of the inner tube at a first and a second position, which first and second position define the boundaries of said vibrationally isolated section.

8. The method of claim 4, wherein in step (c) the vibration of the annulus spacer is continued for a predetermined length of time.

9. The method of claim 1, wherein following step (c) the new position of the annulus spacer is determined by:
   (v) vibrationally isolating a section of the inner tube;
   (vi) vibrating the wall of said inner tube within said isolated section;
   (vii) detecting vibration of the wall at a minimum of two axial positions within said isolated section; and
   (viii) detecting a reduction in vibration level of the wall at one or more of said axial positions in comparison to the remaining axial position(s),
   wherein the reduction in vibration level is indicative of the presence of the annulus spacer at or near the axial position at which said reduction in vibration was detected and wherein steps (a)-(c) are repeated as necessary to move the annulus spacer to a prescribed location about said inner tube.

10. The method of claim 9, wherein said step of vibrationally isolating the section of the inner tube comprises applying pressure to the inner surface of the wall of the inner tube at a first and a second position, which first and second position define the boundaries of said vibrationally isolated section.

11. The method of claim 1, wherein said inner tube is a pressure tube and said outer tube is a calandria tube of a CANDU reactor fuel channel.

\* \* \* \* \*